(12) United States Patent
Mandre (10) Patent No.: US 9,588,787 B2
(45) Date of Patent: *Mar. 7, 2017

(54) RUNTIME VIRTUAL PROCESS CREATION FOR LOAD SHARING

(71) Applicant: Unisys Corporation, Blue Bell, PA (US)

(72) Inventor: Sateesh Mandre, Bangalore (IN)

(73) Assignee: Unisys Corporation, Blue Bell, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/452,898

(22) Filed: Aug. 6, 2014

(65) Prior Publication Data

US 2014/0351813 A1 Nov. 27, 2014

Related U.S. Application Data

(63) Continuation of application No. 13/097,162, filed on Apr. 29, 2011, now Pat. No. 8,832,693.

(51) Int. Cl.
*G06F 9/455* (2006.01)
*G06F 9/50* (2006.01)
*G06F 9/48* (2006.01)

(52) U.S. Cl.
CPC .......... *G06F 9/455* (2013.01); *G06F 9/45558* (2013.01); *G06F 9/4856* (2013.01); *G06F 9/5083* (2013.01); *G06F 2009/4557* (2013.01)

(58) Field of Classification Search
None
See application file for complete search history.

(56) References Cited

U.S. PATENT DOCUMENTS

2010/0257269 A1* 10/2010 Clark .................... G06F 9/4856 709/226

* cited by examiner

*Primary Examiner* — Qing Wu
(74) *Attorney, Agent, or Firm* — Robert P. Marley (57) ABSTRACT

Methods and systems for managing execution of processes in virtual environments are disclosed. One method includes creating a virtual process from a process executing on a first virtual machine, and transferring the virtual process from the first virtual machine to a second virtual machine. The method also includes executing the virtual process on the second virtual machine, and, after the virtual process completes, removing the virtual process from the second virtual machine.

20 Claims, 5 Drawing Sheets

RUNTIME VIRTUAL PROCESS CREATION FOR LOAD SHARING

CROSS-REFERENCE TO RELATED APPLICATIONS

The present application is a continuation application from U.S. patent application Ser. No. 13/097,162, filed on Apr. 29, 2011, the disclosure of which is hereby incorporated by reference in its entirety.

TECHNICAL FIELD

The present disclosure relates generally to operation and management of virtual processes within a virtual computing environment. In particular, the present disclosure relates to runtime virtual process creation for load sharing.

BACKGROUND

Computing systems have a finite set of hardware resources available to perform computing tasks. For example, processor throughput, memory capacity and bandwidth are two primary examples of resources that are allocated to specific computing tasks. Additionally, network bandwidth, I/O capacity and bandwidth, and other features can affect the speed at which computing tasks are performed.

In many systems, one or more application programs are assigned to a particular processor for execution. In these systems, application programs are typically each assigned a thread, and each thread is allocated resources (e.g., by allocating a time share or other basis), so that no single thread dominates usage of the resources of that processor. Typically, processor time and memory space are allocated according to a priority basis. When a system administrator or operator wishes to ensure that a particular, high-priority process receives as much of an available needed resource (e.g., memory or processor time) as possible, that individual will typically assign that resource a higher priority.

However, simply adjusting priority of processes has drawbacks. For example, even when a process is assigned a highest-possible priority, other processes are able to interrupt, for example to perform basic service tasks. When an interrupt occurs and another process is given access to processing resources, it is possible that both processes will not be able to coexist in memory. In this case, one or more processes might be paged out to a swap file or other disk memory, which is a time-consuming operation. Therefore, page swapping is preferably kept to a minimum. Ideally, an individual will offload as many other processes to separate computing systems, thereby entirely removing the need for that process to interrupt. Typically, this involves shutting the process down and transferring the application to the separate computing system. However, transferring executable applications between systems may not be desirable, because the executable could be intercepted by a hacker, and modified or stolen while the file is under transmission. In distributed computing system load balancing is achieved by executing multiple processes in parallel by assigning them to different processors with or without processor affinity. However this assignment is within the system, among the processors controlled by the operating system.

Finite computing resources also present a problem when working with virtual computing systems. Virtual computing systems are systems that operate at the application level of a computing system, and typically include an operating system and other software useable for simulating operation of one instruction set architecture and/or operating system on another type of computing system (e.g., for executing applications or other programs written for the instruction set and/or operating system within the virtual environment). However, migrating a virtual computing system from one computing system to another computing system is a compute-intensive task, particularly at runtime. This is because typically a virtual machine is migrated by taking a "snapshot" of the entire virtual machine and exporting that virtual machine to another set of physical computing hardware for execution. This method of migrating virtual machines has drawbacks. This is because, even when moving a virtual computing system, that does not isolate one particular task within the virtual environment for execution on the new computing hardware, because the entire set of processes executing within the virtual operating system will be included in the snapshot. That is, the lowest-level granularity of process that is typically migrated for virtual machines is the virtual environment itself, which represents the complete virtual machine. When attempting to isolate a particular application or program executing within a virtual environment, it is difficult to isolate that task, particularly during runtime, when its current status, resource usage, and operational dependencies are included within the image of the virtual environment. In particular, in cloud computing environments where the virtual machines are more involved and the application response times are very crucial, process swapping and wait times are undesirable.

For these and other reasons, improvements are desirable.

SUMMARY

In accordance with the following disclosure, the above and other issues are addressed by the following:

In a first aspect, a method for managing execution of processes in virtual environments is disclosed. The method includes creating a virtual process from a process executing on a first virtual machine, and transferring the virtual process from the first virtual machine to a second virtual machine. The method also includes executing the virtual process on the second virtual machine, and, after the virtual process completes, removing the virtual process from the second virtual machine.

In a second aspect, a runtime virtual process creation system includes a first computing system including a memory operatively connected to a programmable circuit, the computing system configured to host a first virtual machine, and a second computing system including a memory operatively connected to a programmable circuit, the computing system configured to host a second virtual machine. The first virtual machine hosts a process executing on that machine. The system also includes a virtual process creation tool configured to create a virtual process from the process executing on the first virtual machine and transfer the virtual process to the second virtual machine. In the system, the second virtual machine is configured to execute the virtual process, and after the virtual process completes, remove the virtual process from the second virtual machine.

In a third aspect, a method of creating a virtual process at runtime is disclosed. The method includes detecting, in a first virtual machine operating on a first computing system, a process to be paged out into main memory. The method also includes creating a virtual process from the process including a snapshot of resources associated with the process, and transferring the virtual process from the first virtual machine to a second virtual machine on a second computing system. The method further includes executing the virtual process on the second virtual machine, and synchronizing execution of the virtual process on the second virtual machine with execution of one or more processes on the first virtual machine.

DETAILED DESCRIPTION

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general, the present disclosure relates to runtime migration of virtual processes, for example as used to accomplish load sharing in a load balancing scenario. According to the methods and systems disclosed herein, a process executing in a virtual machine is considered for converting to a "virtual process", and transferred to a second virtual machine for execution on that virtual machine. The second, or target, virtual machine can be hosted on the same hardware, or on different hardware than the original virtual machine. The second virtual machine can then execute the process. Because the end result of the process is typically a change in state of data external to the process (e.g., creating a file, updating a database, generating a report, or other action) either of the virtual machines can process the data, and therefore it does not matter which virtual machine or physical system in fact executes the process. Therefore, runtime processes can be reallocated among virtual and physical computing systems, allowing efficient allocation of hardware resources to processes requiring dedicated resources.

Figure 1:
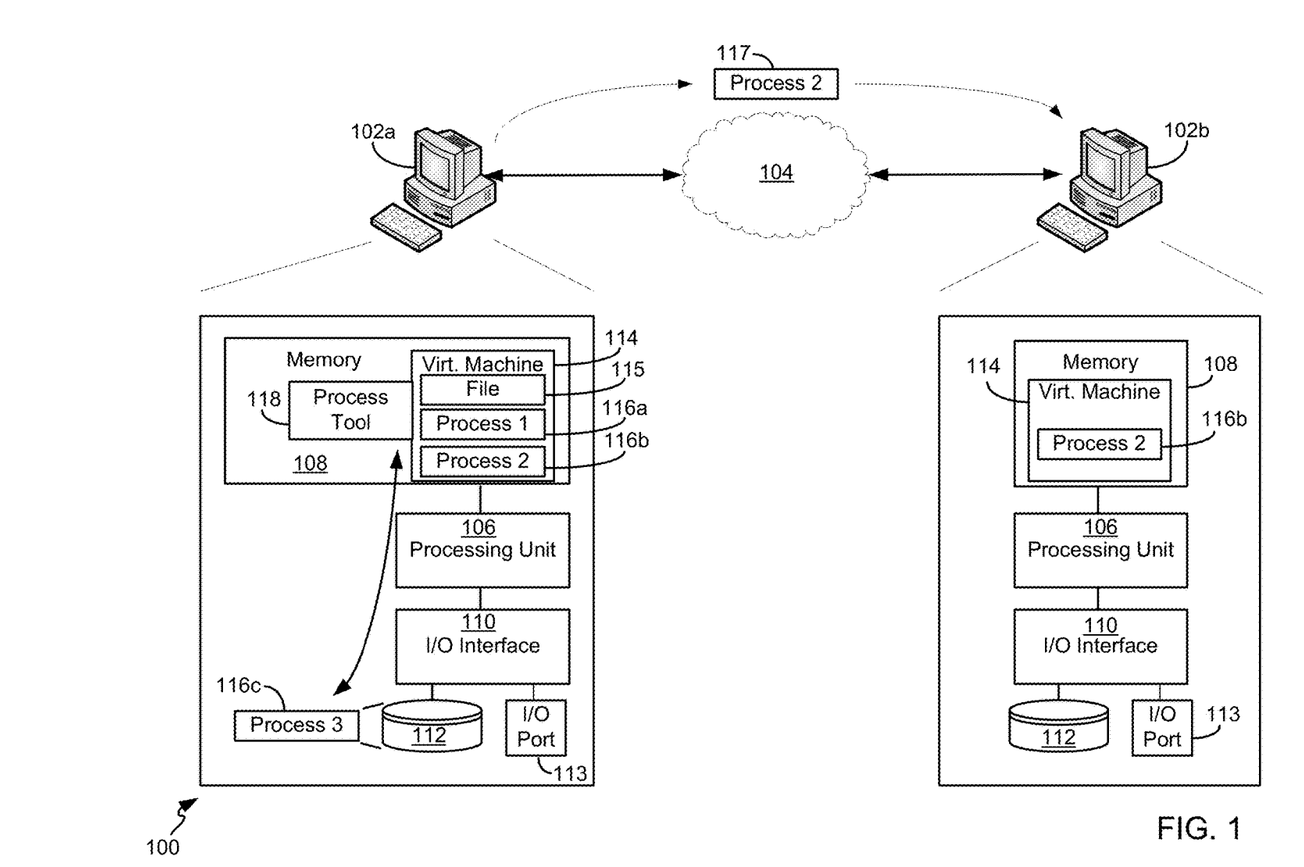
FIG. 1 illustrates an example computing environment in which a runtime virtual process creation system can operate, according to a possible embodiment of the present disclosure.

Referring now to FIG. 1, an example computing environment 100 in which a runtime virtual process creation system can operate is shown, according to a possible embodiment of the present disclosure. The computing environment 100 includes first and second computing systems 102a-b, interconnected by a computing network 104. The computing systems 102a-b can be any of a number of types of computing systems, for example as described below in connection with FIG. 3. The computing network 104 can be any type of local or wide area network; in certain embodiments, the computing network 104 can include the Internet. As such, in certain embodiments, the computing environment can represent a portion of a cloud-based computing environment in which computing tasks can be distributed among a group of computing systems.

In the embodiment shown, each of the computing systems 102a-b includes a processing unit 106 communicatively connected to a memory 108, as well as an input/output interface 110 providing communication with one or more disks 112 and ports 113, useable for communications and/or persistent storage. Additional details regarding types of memory useable in each of the computing systems are described below in connection with FIG. 3; however, for purposes of discussion of the environment 100, typical usage of these hardware systems is discussed here. Typically, one or more processes (e.g., applications, or other processes performed at the operating system level, as described in connection with FIG. 2) are executed on one of the computing systems 102a-b. When a process is to be run, it is loaded from a disk 112 to memory 108 for use by the processing unit 106. When two or more processes are loaded into memory 108 at once, processing capabilities of the processing unit 106 are shared between those two processes. When there are more processes to be run than there exists available memory in the computing system (e.g., including currently-running processes as well as processes scheduled to run), an unused or low priority process is paged out of memory 108 back onto the disk 112, e.g., to a swap file. In the illustrative example shown in FIG. 1, a virtual machine 114 is loaded into memory 108, and includes a number of processes (including at least two processes 116a-b as illustrated). The virtual machine 114 can be any of a number of virtual machines providing hardware virtualization, allowing for convenient segmentation and separation of physical systems from virtual machines, particularly in a cloud environment. In general, the virtual machine 114 hides the characteristics of the underlying hardware system to processes or applications running on that virtual machine, instead presenting those processes with a different system view. In various embodiments, the virtual machine 114 can be implemented using various virtualization software systems available from VMWare, Inc. of Palo Alto, Calif. and Microsoft Virtual Server, available from Microsoft Corporation of Redmond, Wash. Other virtualization software systems could be used as well.

A virtual process creation tool 118 can be included on a computing system 102a-b as well, for example to create a virtual process from one of the processes operating within the virtual machine 114 during runtime of that system. In the embodiment shown, the virtual machine 114 has access to at least a portion of the memory 108 and storage area on the disk 112. As such, the virtual machine 114 can include a number of processes, and can perform page swapping operations as though the virtual machine were running natively on one of the computing systems 102a-b. In the embodiment shown, the virtual machine 114 has swapped process 116c to memory, while processes 116a-b are running. It is noted that each of processes 116a-c are associated with one or more resources of the computing system, for example, memory, I/O ports, or other physical resources that are associated with the process. For example, process 116b may be associated with a particular I/O port, for example for communication to a remote system, printing, or other tasks.

The virtual process creation tool 118 can capture processes in a number of ways. For example, the virtual process creation tool 118 can capture processes as they are paged out to a swap file on a disk (e.g., disk 112). FIG. 1 illustrates a circumstance in which, within the virtual machine 114, processes can be paged out to disk, for example where the portion of the memory 108 that is allocated to the virtual machine 114 is consumed. In the example illustrated in FIG. 1, a third process 116c is restored from disk 112, for example due to the process being scheduled by the virtual machine 114. As such, another process, such as the second process 116b, must be paged out into disk memory to make room in memory allocated to the virtual machine 114 for that process. The virtual process creation tool 118 can detect this paging process, for example through interfacing with the process at the level of either the virtual machine 114 or a host operating system. The virtual process creation tool 118 can then capture a snapshot 117 of the process (as it is captured in the memory block to be paged out) as well as any data or resource dependencies associated with that process (e.g., port ownership, file handles or other memory pointers, register values, etc.) for recreation on another virtual machine. The snapshot can therefore contain information defining the process and its execution state within a particular operating system or virtual machine without requiring capture of attendant operating system or virtual system software. In the embodiment shown, the snapshot can be stored in a snapshot file, and will contain an image of process 116b, which could, for example, include a handle open to file 115 loaded in memory within the virtual machine 114.

In certain embodiments, the virtual process creation tool 118 can be stored on each of the computing systems 102*a-b*, for example within the instantiation of the virtual machine 114. For example, in the example illustrated, the virtual process creation tool 118 resides in memory 108 of the source system from which the process is exported. In other embodiments, the virtual process creation tool 118 can be stored on a computing system separate from those systems, for example in the case where a particular process within a virtual machine 114 is to receive as many hardware resources as possible (because the virtual process creation tool 118 will consume at least a portion of the hardware resources due to resource usage monitoring).

In the embodiment shown, the virtual process creation tool 118 can move the virtual process to a different virtual machine, either on the same computing system or a different computing system. As illustrated, a snapshot of process 116b is moved to a different computing system, 102b, for example in a file containing the snapshot, or snapshot file 117. Therefore, processes requiring dedicated resources can be offloaded to separate computing systems for execution, and the data results (e.g., a written file or memory values) can be shared among the virtual machines through shared/copied pointers to those files/values in the original computing system.

Through usage of the virtual process creation tool 118, a user can capture and export processes at runtime without requiring export of an entire virtual machine (e.g., making a copy of the entire virtual machine 114 for operation on computing system 102b). As such, processes can be exchanged at runtime among virtual machines on the same computing system, or on different computing systems. Therefore, the resources present in a particular physical system, or the resources allocated to a particular virtual machine, can be overcome by isolating processes on a particular virtual machine.

Using the environment of FIG. 1, it is recognized that the source computing system 102*a* will retain ownership of each of the processes included within its virtual environment, and only processing tasks are passed to the second computing system (computing system 102*b*) with the virtual process. The second computing system 102*b* receiving the virtual process can perform computing tasks in synchronization with other tasks occurring at the source computing system 102*a*.

Figure 2:
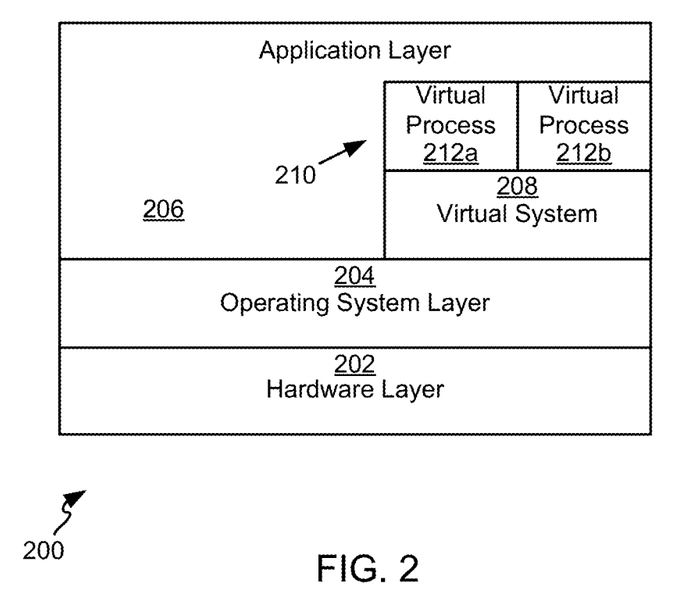
FIG. 2 is a logical block diagram of a system stack illustrating operation of a process within a virtual environment.

FIG. 2 is a logical block diagram of a system stack 200 illustrating operation of a process within a virtual environment. The system stack 200 can, for example, represents a software and hardware stack operating on a computing system, such as the computing systems 102*a-b* of FIG. 1. In general, the system stack 200 illustrates a physical layer 202, which represents hardware resources of a computing system on which a process can be configured to run. The hardware resources can include capacity and capabilities of physical components of a computing device, such as the computing device 300 of FIG. 3. The physical layer 202 can therefore include, for example, a hardware system architecture and defined instruction set architecture of a computing system.

An operating system layer 204 operates on top of the physical layer 202, and can include, for example, a native kernel or operating system capable of executing instructions capable of being executed by the physical layer. For example, if the physical layer is designed to operate using an x86-64 instruction set architecture. The operating system layer 204 is, when compiled into executable code, capable of operation directly on that physical layer by using the instruction set defined by x86-64. Other architectures, such as IA64, PowerPC, RISC, SPARC, or POWER instruction sets, could be used as well. The operating system layer 204 generally manages allocation of physical resources to applications, including memory allocation/deallocation, I/O port allocation, disk accesses, as well as interrupt or alarm management and resource sharing protocols. Other features can be included in the operating system layer 204 as well.

An application layer 206 executes on top of, and is hosted by the operating system layer 204. The application layer 206 also executes instructions based on the instruction set architecture defined by the physical layer, but resides at one level of abstraction up from the operating system layer Within the application layer 206, a virtualization layer 208 is illustrated. A virtualization layer can be used as a runtime interface in which processes or applications designed to run within one type of computing environment (e.g., with a particular operating system or on a particular instruction set architecture) can run within a "closed" environment that translates between the process and the physical system on which the virtualization layer 208 resides.

A virtualized application layer 210 is hosted by the virtualization layer, and includes one or more processes 212*a-b* operating within a virtual machine operating within that layer. The processes 212*a-b* operating within the virtualized application layer 210 are not required to execute natively on the hardware defined in the physical layer 202; rather, a virtual machine within the virtualization layer 208 translates the processes for execution within the physical layer 202, and provides access to physical resources to that virtualized process.

It is noted that typically, from the perspective of the operating system layer 204 or other systems in the application layer 206, virtualized processes in the virtualized application layer 210 are typically not visible as separate from the virtual machine on which they reside. This is because the virtual machine, within the virtualization layer 208, is typically viewed as a process that handles translation of instructions between the physical layer and virtual process. As such, the operating system or other applications in the system cannot distinguish one virtual process from another virtual process when both reside within a virtual machine. Hence, as discussed above, a virtual process creation tool (e.g., virtual process creation tool 118 of FIG. 1) can be included within the virtual machine, for example at the virtualization layer 208, to view processes hosted by the virtualization layer 208, for runtime capture and migration among virtual and/or physical systems. As such, virtual processes can be created that lack operating system software, either from the native operating system on the computing system hosting the virtual machine, or the operating system executing within the virtual machine.

Typically, an operating system, either within the operating system layer 204 or the virtualization layer 206, will associate each user process with a block of memory for user process address space (e.g., 2 GB in some operating systems), and will also include a shared kernel address space. The user process address space is the set of virtual address ranges available in virtual memory, and contains the program image being executed. The process address space will have all segments of the process image, including the data segment, code segment, and stack segment. In the case of migrating virtual processes between machines such as is disclosed herein, the address space is tracked in the virtual machine is mapped to address space in a target virtual machine. By maintaining synchronization between the target virtual machine (e.g., virtual machine 114 on computing system 102b) and the source virtual machine (e.g., virtual machine 114 on computing system 102a), data dependencies among files accessible to the process can be maintained.

Additionally, a process control block ("PCB", also called Task Controlling Block or Task Struct) is a data structure managed at the operating system layer 204 or the virtualization layer 206 that includes information needed to manage a particular process. When a virtual process (e.g., snapshot 117 of FIG. 1) is created for any process operating within a virtual machine, the existing PCB is deleted in the operating system kernel, thereby indicating that the process is no longer executing on that system. However, a new PCB is created that defines a control block in that first system for the new virtual process to be sent to another system, to indicate the first system's continued ownership of the process.

Figure 3:
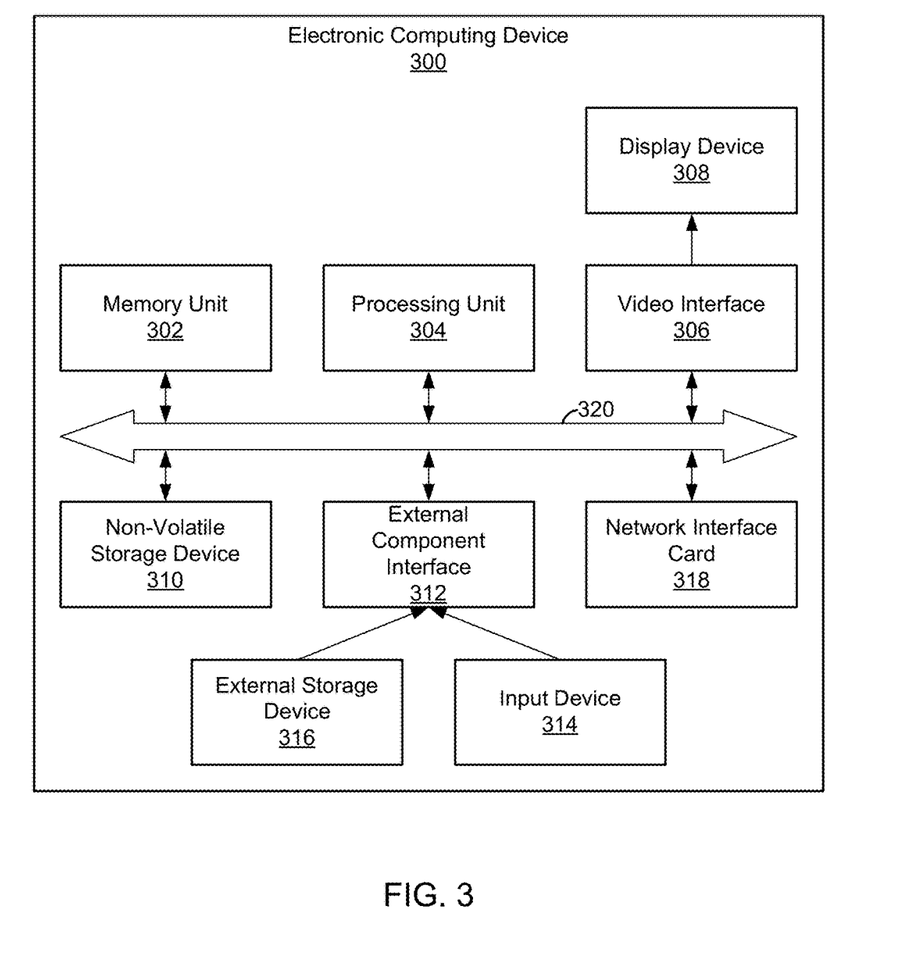
FIG. 3 is a block diagram illustrating example physical components of an electronic computing device useable to implement the various methods and systems described herein.

FIG. 3 is a block diagram illustrating example physical components of an electronic computing device 300, which can be used to execute the various operations described above, and provides an illustration of further details regarding any of the computing systems described above in FIGS. 1-2 and FIG. 4. A computing device, such as electronic computing device 300, typically includes at least some form of computer-readable media. Computer readable media can be any available media that can be accessed by the electronic computing device 300. By way of example, and not limitation, computer-readable media might comprise computer storage media and communication media.

As illustrated in the example of FIG. 3, electronic computing device 300 comprises a memory unit 302. Memory unit 302 is a computer-readable data storage medium capable of storing data and/or instructions. Memory unit 302 may be a variety of different types of computer-readable storage media including, but not limited to, dynamic random access memory (DRAM), double data rate synchronous dynamic random access memory (DDR SDRAM), reduced latency DRAM, DDR2 SDRAM, DDR3 SDRAM, Rambus RAM, or other types of computer-readable storage media.

In addition, electronic computing device 300 comprises a processing unit 304. As mentioned above, a processing unit is a set of one or more physical electronic integrated circuits that are capable of executing instructions. In a first example, processing unit 304 may execute software instructions that cause electronic computing device 300 to provide specific functionality. In this first example, processing unit 304 may be implemented as one or more processing cores and/or as one or more separate microprocessors. For instance, in this first example, processing unit 304 may be implemented as one or more Intel Core 2 microprocessors. Processing unit 304 may be capable of executing instructions in an instruction set, such as the x86 instruction set, the POWER instruction set, a RISC instruction set, the SPARC instruction set, the IA-64 instruction set, the MIPS instruction set, or another instruction set. In a second example, processing unit 304 may be implemented as an ASIC that provides specific functionality. In a third example, processing unit 304 may provide specific functionality by using an ASIC and by executing software instructions.

Electronic computing device 300 also comprises a video interface 306. Video interface 306 enables electronic computing device 300 to output video information to a display device 308. Display device 308 may be a variety of different types of display devices. For instance, display device 308 may be a cathode-ray tube display, an LCD display panel, a plasma screen display panel, a touch-sensitive display panel, a LED array, or another type of display device.

In addition, electronic computing device 300 includes a non-volatile storage device 310. Non-volatile storage device 310 is a computer-readable data storage medium that is capable of storing data and/or instructions. Non-volatile storage device 310 may be a variety of different types of non-volatile storage devices. For example, non-volatile storage device 310 may be one or more hard disk drives, magnetic tape drives, CD-ROM drives, DVD-ROM drives, Blu-Ray disc drives, or other types of non-volatile storage devices.

Electronic computing device 300 also includes an external component interface 312 that enables electronic computing device 300 to communicate with external components. As illustrated in the example of FIG. 3, external component interface 312 enables electronic computing device 300 to communicate with an input device 314 and an external storage device 316. In one implementation of electronic computing device 300, external component interface 312 is a Universal Serial Bus (USB) interface. In other implementations of electronic computing device 300, electronic computing device 300 may include another type of interface that enables electronic computing device 300 to communicate with input devices and/or output devices. For instance, electronic computing device 300 may include a PS/2 interface. Input device 314 may be a variety of different types of devices including, but not limited to, keyboards, mice, trackballs, stylus input devices, touch pads, touch-sensitive display screens, or other types of input devices. External storage device 316 may be a variety of different types of computer-readable data storage media including magnetic tape, flash memory modules, magnetic disk drives, optical disc drives, and other computer-readable data storage media.

In the context of the electronic computing device 300, computer storage media includes volatile and nonvolatile, removable and non-removable media implemented in any method or technology for storage of information such as computer readable instructions, data structures, program modules or other data. Computer storage media includes, but is not limited to, various memory technologies listed above regarding memory unit 302, non-volatile storage device 310, or external storage device 316, as well as other RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the electronic computing device 300.

In addition, electronic computing device 300 includes a network interface card 318 that enables electronic computing device 300 to send data to and receive data from an electronic communication network. Network interface card 318 may be a variety of different types of network interface. For example, network interface card 318 may be an Ethernet interface, a token-ring network interface, a fiber optic network interface, a wireless network interface (e.g., WiFi, WiMax, etc.), or another type of network interface.

Electronic computing device 300 also includes a communications medium 320. Communications medium 320 facilitates communication among the various components of electronic computing device 300. Communications medium 320 may comprise one or more different types of communications media including, but not limited to, a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computer System Interface (SCSI) interface, or another type of communications medium.

Communication media, such as communications medium 320, typically embodies computer-readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

Electronic computing device 300 includes several computer-readable data storage media (i.e., memory unit 302, non-volatile storage device 310, and external storage device 316). Together, these computer-readable storage media may constitute a single data storage system. As discussed above, a data storage system is a set of one or more computer-readable data storage mediums. This data storage system may store instructions executable by processing unit 304. Activities described in the above description may result from the execution of the instructions stored on this data storage system. Thus, when this description says that a particular logical module performs a particular activity, such a statement may be interpreted to mean that instructions of the logical module, when executed by processing unit 304, cause electronic computing device 300 to perform the activity. In other words, when this description says that a particular logical module performs a particular activity, a reader may interpret such a statement to mean that the instructions configure electronic computing device 300 such that electronic computing device 300 performs the particular activity.

One of ordinary skill in the art will recognize that additional components, peripheral devices, communications interconnections and similar additional functionality may also be included within the electronic computing device 300 without departing from the spirit and scope of the present invention as recited within the attached claims.

Figure 4:
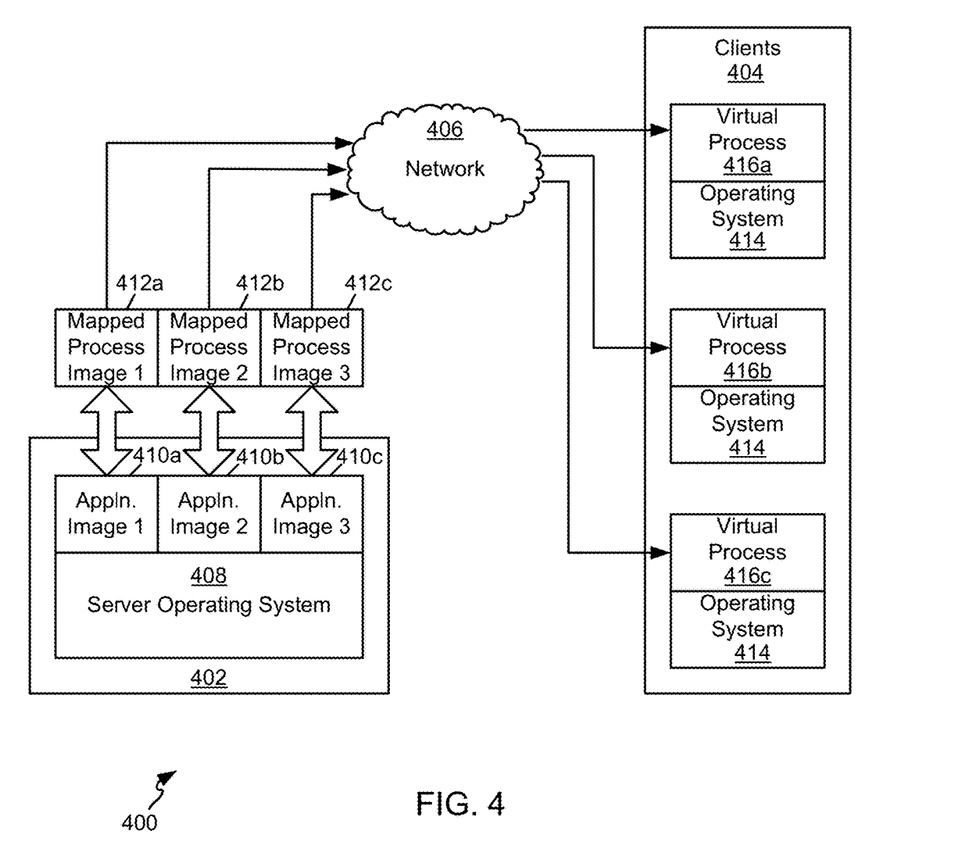
FIG. 4 is a schematic diagram of a runtime virtual process creation system in a client-server configuration, according to a possible embodiment of the present disclosure.

Referring now to FIG. 4, a schematic diagram of a runtime virtual process creation system 400 in a client-server configuration is illustrated, according to a possible embodiment of the present disclosure. The runtime virtual process creation system 400 can, in certain embodiments, represent a particular application of the methods and systems described above with respect to FIG. 1, in which the virtual process creation occurs specifically within a client-server arrangement and where distributed server computing capabilities (e.g., "cloud computing") is employed.

In the embodiment shown, a server 402 is communicatively connected to one or more client devices (referred to collectively as clients 404) via a network 406, such as the Internet. The server 402 hosts a server operating system 408, which can, in certain embodiments, correspond to a virtual machine, as described above in connection with FIG. 1.

The server operating system hosts a plurality of processes 410a-c, which reside in memory of the server 402. These processes 410a-c can be mapped to snapshots 412a-c, for example using a virtual process creation tool such as described above. Each of those snapshots 412a-c of processes executing on the server 402 can be transmitted over the network 406 to one or more of the clients 404 for viewing and interacting. Each client has an operating system 414, which can in certain embodiments include a virtualized operating system, such as virtual machine resident in memory of a target computing system (e.g., computing system 102b of FIG. 1). Each of the snapshots 412a-c can be transferred to clients and executed as virtual processes 416a-c within the virtual machines managed at the clients 404.

A number of applications of the system 400 are possible, particularly in a client-server environment. One example use of the embodiment shown in FIG. 4 as system 400 is related to debugging of an application that is running on the server 402 using a client machine (any one or more machines among clients 404). In this example, every time the status of the application changes on the server system, an entire application would be transferred to the client to reflect the changes on the client machine.

In a further example, a user of a client 404 may wish to edit a file on the server 402. In this example, it may be the case that the file cannot be downloaded to the client for editing due to security and privacy concerns. As such, it must be modified by the client as part of a running process, and any changes to the file need to be saved back to the server 402. In this scenario, the client, after connecting to server 402, opens the file using a file editor process (e.g., one of the processes 410a-c) running on server 402. The file editor runs as a process in the server 404 and opens the file. Both editor and file are in server's memory (e.g., RAM) as part of the running process there (e.g., as illustrated in FIG. 1). However, internet speed becomes a major concern in working on the remote file. By capturing a snapshot of the server process representing the file editor, the client can perform file editing operations while maintaining file synchronization between the client and server. The user can therefore edit the file without getting blocked by internet traffic throughout his work. Once the user completes editing the file at the client, the file can be stored back to the server memory.

Additionally, using the methodology described herein, multiple client devices can receive a copy of a same snapshot 412*a-c*, allowing multiple clients to use the same application via multithreading and application sharing, and results of client activity are synchronized at the server file storage, since each process snapshot includes only a handle to the file stored on the server.

Figure 5:
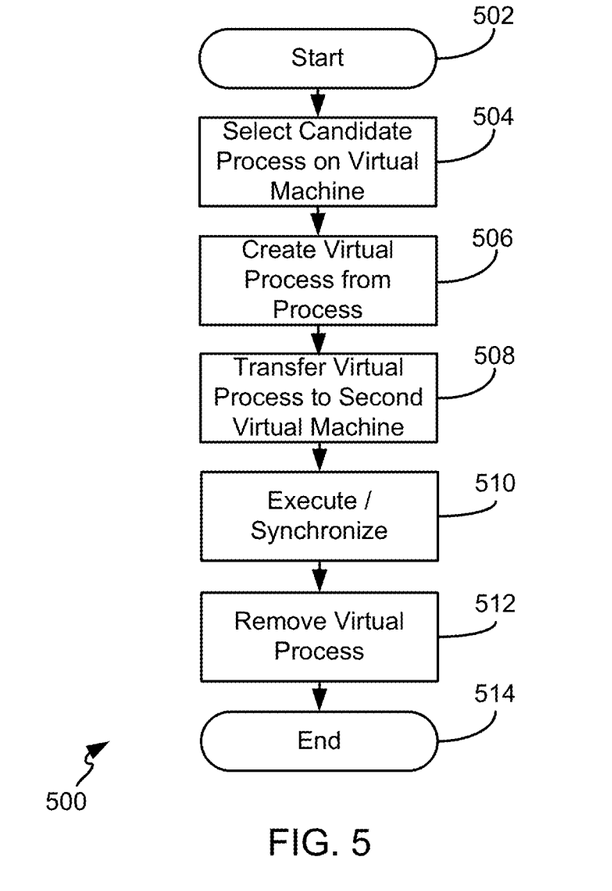
FIG. 5 illustrates an example method of managing execution of processes in a plurality of virtual environments, according to a possible embodiment of the present disclosure.

FIG. 5 illustrates an example method 500 of managing execution of processes in a plurality of virtual environments, according to a possible embodiment of the present disclosure. The method 500 can be performed in any of the computing systems or environments discussed above, in connection with the various embodiments of systems implementing runtime virtual process creation according to the present disclosure. The method 500 is instantiated at a start operation 502, which can, in certain embodiments, correspond to startup of a virtual machine on a hardware system, and startup of one or more processes on that virtual machine that are intended to be captured as a runtime virtual process.

A candidate process selection operation 504 selects a candidate process to migrate away from the virtual machine. This can occur, for example, by detecting a process to be paged out to disk storage by a virtual machine, as mentioned above. A virtual process creation operation 506 creates a virtual process from the process executing within the virtual machine. In certain embodiments, the virtual process creation operation 506 captures a snapshot of the status of the process when the process is to be paged out to memory, so that the paged-out data block can easily be used to reflect the process to be executed, in its current form. In connection with this data block, any file handles, registers, ports, or other external resources can be gathered and tracked for use in the snapshot.

Alternatively to capturing an image at the time a process is to be paged out, the candidate process selection operation 504 can simply occur at any arbitrary time during runtime of the process, resulting in the virtual process creation operation 506 taking a snapshot of a system state when a particular process is running, and offload the portion of the snapshot attributable to the process (e.g., memory space, register values, file handles, and other attributes associated with that process).

A transfer operation 508 transfers the captured virtual process to a second virtual machine from the virtual machine on which it is captured. In various embodiments, the second virtual machine can be another virtual machine operating on the same host hardware system, or can be another virtual machine operating on separate hardware (e.g., a different microprocessor or a different computing system overall).

An execution operation 510 corresponds to execution of the virtual process on that second virtual machine to which the virtual process was transferred. In certain embodiments, the execution operation 510 includes synchronization of the virtual process with the first computing system from which it was extracted (e.g., particularly in the case where any data dependencies, such as memory or register values, or file handles may exist on that original machine).

A removal operation 512 removes the virtual process from the second computing system, resulting in the data synchronized by the execution operation 510 being made available to the original virtual machine, while removing extraneous data describing that now-completed virtual process. An end operation 514 corresponds to completion of the migrated virtual process, for example allowing continued operation of non-migrated processes at the first virtual machine, migration of other processes to the second virtual machine, or further load balancing of processes among virtual machines.

Overall, a number of advantages of the methods and systems of the present disclosure exist, and particularly relate to sharing of processes among server systems, for example relating to load balancing among virtual machines, and apportioning processes to specific hardware systems. For example, moving an image of a process between two computing systems, along with any required input files or file pointers and other status information, results in economical bandwidth usage and distribution of processing tasks. When the work load grows beyond a specified limit in memory, that computing system can then send some of its images in memory to other servers by mapping processes to other servers, rather than paging the results to memory. In this circumstance, execution is performed on those other servers, and the effect is seen on the source server. Additionally, these process images are only present on a remote server only for the duration of execution of the process; once that process completes, the process can be deleted entirely from that remote system, since the source server retains the ownership of the process. Additional advantages exist as well.

The above specification, examples and data provide a complete description of the manufacture and use of the composition of the invention. Since many embodiments of the invention can be made without departing from the spirit and scope 70 of the invention, the invention resides in the claims hereinafter appended.

The invention claimed is:

1. A method of managing execution of a process in a virtual environment, the method comprising:
   creating a virtual process based on a snapshot of a process hosted on a first virtual machine of a host platform;
   transferring the virtual process from the first virtual machine to a second virtual machine; and
   after resumed execution of the virtual process complete at the second virtual machine, receiving synchronized data from the second virtual machine at the first virtual machine.

2. The method of claim 1, wherein the synchronized data is used by the first virtual machine to update results of the process.

3. The method of claim 1, further comprising, after transferring the virtual process to the second virtual machine, suspending further execution of the process on the first virtual machine until resumed execution of the virtual process is completed.

4. The method of claim 1, wherein the virtual process is further based on one or more external resources associated with the process, the one or more external resources selected from the group consisting of a file handle, a register, and a port.

5. The method of claim 1, wherein the first virtual machine and the second virtual machine execute on the host platform.

6. The method of claim 1, wherein transferring the virtual process from the first virtual machine to a second virtual machine comprises transmitting the virtual process from a first computing system to a second computing system.

7. The method of claim 6, wherein the first computing system comprises a server system and the second computing system comprises a client system.

8. The method of claim 1, wherein the snapshot is based at least in part on a swap file generated by the first virtual machine of the host platform.

9. The method of claim 1, further comprising, after creating the virtual process, deleting a process control block associated with the process on the first virtual machine.

10. The method of claim 9, further comprising building a new process control block in the first virtual machine indicating ownership of the virtual process by the first virtual machine.

11. The method of claim 10, further comprising transmitting the new process control block to the second virtual machine.

12. The method of claim 1, further comprising:
receiving the virtual process at the second virtual machine;
resuming executing the virtual process on the second virtual machine; and
after resumed execution of the virtual process completes, transmitting synchronized data from the second virtual machine to the first virtual machine.

13. A method of managing execution of a process in a virtual environment, the method comprising:
receiving a virtual process from a first virtual machine at a second virtual machine, the virtual process based on a snapshot of a process hosted on a first virtual machine and the second virtual machine hosted on a host platform;
resuming executing the virtual process on the second virtual machine; and
after resumed execution of the virtual process completes, transmitting synchronized data from the second virtual machine to the first virtual machine.

14. The method of claim 13, further comprising, after execution of the virtual process completes, removing the virtual process from the second virtual machine.

15. A virtualization system comprising:
a host computing system;
a first virtual machine executing on the host computing system and hosting a process;
a process tool executing on the host computing system, the process tool including program instructions which, when executed, cause the host computing system to:
create a virtual process based on a snapshot of a process hosted on the first virtual machine; and
transfer the virtual process from the first virtual machine to a second virtual machine; and
wherein, after resumed execution of the virtual process completes at the second virtual machine, the first virtual machine receives synchronized data from the second virtual machine.

16. The virtualization system of claim 15, wherein the second virtual machine:
receives the virtual process from a first virtual machine;
resumes executing the virtual process on the second virtual machine; and
after resumed execution of the virtual process completes, transmits synchronized data to the first virtual machine.

17. The virtualization system of claim 16, further comprising a second host computing system hosting the second virtual machine, the second host computing system communicatively connected to the first host computing system.

18. The virtualization system of claim 15, further comprising the second virtual machine, wherein the second virtual machine executes on the host computing system.

19. The virtualization system of claim 15, wherein the process comprises a user-level application executing within the first virtual machine and hosted by an operating system within the first virtual machine.

20. The virtualization system of claim 15, wherein the process tool is further configured to transfer the virtual process from the first virtual machine to a third virtual machine separate from the second virtual machine.

* * * * *